UNITED STATES PATENT OFFICE.

JULES MEURANT, OF LIEGE, BELGIUM.

PAINT AND PROCESS OF MAKING THE SAME.

963,917.     Specification of Letters Patent.     Patented July 12, 1910.

No Drawing.     Application filed April 21, 1908. Serial No. 428,308.

*To all whom it may concern:*

Be it known that I, JULES MEURANT, a subject of the King of Belgium, residing at Liege, in the Province of Liege, Belgium, have invented new and useful Improvements in Paints and Processes of Making the Same, of which the following is a specification.

The object of the invention is to provide a suitable paint adapted for use in place of paints containing white lead, oxid of zinc, &c.

My newly invented paint is preferably the product of the preferred method or process hereinafter set forth. In proceeding in accordance with this preferred novel process, I intimately mix together oxid of lead (litharge) and boric acid in the proportions of three parts of oxid of lead to two parts of said acid, and heat the mixture to a temperature of about 200 degrees centigrade in a crucible or the like until chemical reaction takes place, and the water resulting therefrom is eliminated by the heat, leaving, as the product, borate of lead, which when reduced to powdered or finely divided condition, and mixed in essential quantities with a suitable vehicle, as oil, forms a paint adapted for substantially the same uses as paints formed from white lead, oxid of zinc, or other pigments.

The quantity of boric acid can be varied somewhat, but it is desirable to use a quantity of said acid slightly in excess of that actually indicated for proper combination with the given quantity of oxid of lead, in order that there shall be no traces of oxid of lead in the product. The proportions above named, however, produce a lead borate which closely approaches a white color.

The great density of the borate thus produced reduces to a minimum the quantity of dust formed during the process of manufacture, and such dust does not in itself present any element of danger, and the product obtained is exempt from many of the objectionable features of white lead, and oxid of zinc, and particularly free from the objectionable poisonous character of white lead.

The color of the product can be varied by introducing into the mixture small quantities of oxids of appropriate metals.

I prefer to employ orthoboric acid ($H_3BO_3$) as the flux in the above described process, but, for certain purposes of the invention, other forms or derivatives of boric acid may be employed.

It is characteristic of my improved liquid paint that it shall contain mixed with a suitable vehicle lead borate constituting at least 25 per cent. of the mixture, which percentage is preferably materially increased to meet the conditions of use in case the mixture contains no other solid matter.

What I claim as new and desire to secure by Letters Patent is—

1. A liquid paint containing at least 25 per cent. of lead borate as a pigment mixed with a suitable vehicle.

2. The process of making liquid paint which consists in fluxing at a suitable temperature oxid of lead with orthoboric acid, reducing the product to finely divided form, and mixing the same as a pigment with a suitable vehicle to form a liquid paint, of which mixture said pigment constitutes at least 25 per cent.

JULES MEURANT.

Witnesses:
GEORGES DE PIERPONT,
ALFRED DE CONNE.